Patented Jan. 22, 1952

2,583,254

UNITED STATES PATENT OFFICE 2,583,254

HYDROCARBON SYNTHESIS CATALYST

Alfred Clark, Bartlesville, Okla., assignor to Phillips Petroleum Company, a corporation of Delaware No Drawing. Application December 5, 1947, Serial No. 790,017

5 Claims. (Cl. 260—449.6)

The present invention relates to the synthesis of hydrocarbons by the catalytic reduction of carbon monoxide with hydrogen. More particularly the invention relates to novel catalysts for this reaction and to process for carrying out such a reaction utilizing the novel catalysts referred to.

In the synthesis of hydrocarbons by the method commonly known as the Fischer-Tropsch process, carbon monoxide and hydrogen may be reacted at elevated temperatures and at atmospheric or higher pressures in the presence of a suitable catalyst, to yield hydrocarbons ranging in molecular weight and constitution all the way from methane to waxy materials, with the concomitant formation of varying amounts of oxygenated material, depending on the nature of the catalyst and the reaction conditions.

The reaction is generally carried out in a manner which will yield substantial proportions of hydrocarbons boiling in the gasoline range as well as higher boiling hydrocarbons. Catalysts used in this synthesis include cobalt, iron, nickel, or ruthenium, and these may be promoted with alkali metals, alkaline earth metals or their oxides, thoria or various other known materials. The catalysts of the prior art may be utilized on inert supports, such as kieselguhr or the like. Using cobalt-containing catalysts, temperatures in the range of about 125–225° C. may be used with a preferred temperature being about 185–190° C. Ordinary iron catalysts operate best in a narrow range close to 240° C. while sintered iron catalysts require temperatures in the neighborhood of 320° C.

The synthesis reaction is ordinarily carried out at atmospheric or medium pressures, depending on the products desired and the catalyst used. A preferred range of pressures suitable for general use is from about 5 to about 15 atmospheres, but pressures up to 150 atmospheres or even higher may be used. Flow rates are variable depending on a number of factors such as catalyst, products desired, and the nature and extent of cooling.

In application Serial No. 760,500, filed July 11, 1947, of which applicant is a co-inventor, novel catalysts of the fused or sintered iron type, and their manner of preparation and use, are discussed. These catalysts are prepared by the reduction of $Fe_3O_4$, ferrosoferric oxide, which oxide may be obtained by the burning of iron with oxygen with the resultant formation of a molten mass of the iron oxide, followed by crushing of the mass and reduction to the metallic state. It was found, however, that the pure or unpromoted iron catalysts do not produce optimum results in the reactions particularly when used in finely divided, or fluidized form. Such results are manifested by lowered efficiency and increased methane formation, as well as other effects. It was found that potassium oxide and alumina together function as effective promoters when incorporated with the metallic iron.

The use of potassium oxide alone as a promoter is undesirable because, if enough is added to increase the production of hydrocarbons to an economic percentage of the carbon monoxide converted, the product is too heavy. On the other hand, if less potassia is added, too much carbon monoxide is converted to methane, carbon dioxide and light gases. Alumina, of itself, as a promoter, fails to function satisfactorily as a promoter to give increased yields of hydrocarbons in the desired boiling range, and furthermore appears to hinder the reduction of the iron oxide.

The use of alumina in combination with potassium oxide in the proper proportions, to doubly promote the iron catalyst provides a more efficient catalyst and improves the product, as described in the aforesaid co-pending application. The alumina appears to modify the effects of potassium oxide and thus provides a means for narrowing the range of product distribution and at the same time obtaining product in the desired range.

It was also found that the reduction temperature is of great importance in the preparation of these catalysts. Too high a temperature produces catalysts with low activity while too low a temperature results in catalysts which are difficult to control and the time required on the reduction is too long and possibly never complete. It was further found that the optimum conditions for reduction are temperatures of 475–550° C. for a minimum period of 42 hours, after which reduction is substantially complete. An important feature of the invention described in the co-pending application is the discovery that, while alumina hinders the reduction of the catalyst, at these temperatures the potassia combines with the alumina and reduces this effect, so that it is possible to use up to 3-4 weight per cent alumina provided that it is combined with potassium oxide so that the excess alumina does not exceed and is preferably below 2 weight per cent. Excess alumina is desirable because it is found that the alumina exerts a surface effect on the catalyst, increasing its rate of carbidization and increasing the surface area and its catalystic power for this synthesis. Satisfactory ranges for the potassia content are 0.05-1.0 per cent of the original $Fe_3O_4$ and the alumina molecularly equivalent to the potassia and in addition 1-2 weight per cent excess alumina (the total alumina not to exceed about 4 per cent).

In accordance with the present invention catalysts of the type described in the co-pending application referred to may be materially improved in important respects by the incorporation of calcium oxide as an added promoter and/or modifier, provided this addition is carried out in certain definite and critical proportions. Catalysts promoted with $K_2O$ and $Al_2O_3$ alone are highly effective, as discussed in said co-pending application. However, such catalysts frequently become "wild," resulting in excessive temperature increases and consequent formation of undesired products, etc. This "wildness" is apparently due to excess wax formation and buildup on the catalyst with resultant heat transfer difficulties and uncontrollable reaction. It was further found, that calcium oxide, when added to an alumina-potassia promoted iron catalyst in certain definite proportions gave marked improvement in conversion and higher $C_5+$ efficiency. At the same time the catalyst could be operated for considerably longer periods before requiring reactivation or re-reduction. The calcium oxide in proper proportions therefore was found to inhibit the formation of free carbon and high molecular weight waxes.

An object of the present invention, therefore, is the provision of a novel catalyst for the synthesis of hydrocarbons, and a process for such synthesis utilizing said catalyst. More particularly, an object of the invention is the provision of a reduced iron oxide catalyst promoted and modified by the incorporation of $Al_2O_3$, $K_2O$ and $CaO$, and the carrying out hydrocarbon synthesis form CO and $H_2$ mixtures using said catalyst.

In the preparation of the catalyst of the present invention calcium oxide is incorporated into the iron along with the other oxides in the proportion of about 1 to 10 per cent by weight based on the $Fe_3O_4$ from which the metallic iron is obtained by reduction. Preferably the $CaO$ is utilized in the proportion of about 3-7 per cent since it appears to be most effective for the purpose in this concentration. The calcium oxide was found to be ineffective or undesirable at lower concentrations, and in the presence of $K_2O$ and $Al_2O_3$ appeared to act as an inhibitor for the synthesis reaction. On the basis of metallic iron, the proportions are: $K_2O$, 0.07-1.4%, $Al_2O_3$ 1.4-2.8% excess more than the molecular equivalent of $Al_2O_3$ to the $K_2O$, and 1.3-13% $CaO$.

The following table contains illustrative examples of the practice of the invention:

Table

Conversion data:
    Reaction temperature_____ 295° C. (563° F.)
    Pressure_____ 250 p. s. i. g.
    Space velocity_____ 2400-2600
    Recycle ratio_____ 6-8

Catalyst—Reduced iron oxide, promoted as indicated.

| Run No. | Catalyst | Conversion, Per Cent | Recovered, $C_3+$ | Per Cent Efficiency, $C_5+$ |
|---|---|---|---|---|
| 113-1 | ¼% $K_2O$ + 1½% $Al_2O_3$ | 94-95 | 62-65 | 44-48 |
| 114 | ½% $K_2O$ + 1½% $Al_2O_3$ | 95-96 | 69-76 | 53-60 |
| 115 | ¼% $K_2O$ + 1½% $Al_2O_3$ + ¼ $CaO$ | 94-95 | 65-68 | 42-46 |
| 118 | ½% $K_2O$ + 1½% $Al_2O_3$ + ½% $CaO$ | 97-98 | 68-70 | 55-58 |
| 120-1 | ½% $K_2O$ + 1½% $Al_2O_3$ + 5% $CaO$ | 98-99 | 74-77 | 61-65 |
| 120-2 | ½% $K_2O$ + 1½% $Al_2O_3$ + 5% $CaO$ | 99 | 76-80 | 65-70 |

The above data show that the $C_5+$ efficiency of $K_2O + Al_2O_3$ promoted catalysts is slightly decreased by the use of $CaO$ as a promoter in small proportions. On the other hand, 5% $CaO$ effects a material increase both in conversion, and $C_3+$ and $C_5+$ efficiency. The beneficial effect of the calcium oxide becomes apparent at concentrations of about 1 per cent, based on $Fe_3O_4$. There appears to be no advantage in using more than about 10 per cent, and catalysts containing more than 10 per cent calcium oxide, based on $Fe_3O_4$, have the disadvantage of comparatively low resistance to attrition during use.

The catalyst may be prepared in the following manner:

Iron in the form of short lengths of wire or strips, is tied into small bundles and weighed. It is then placed in a steel crucible of suitable dimensions and the crucible with its contents is brought to a dull red heat by means of a gas burner. The gas flame is then removed and oxygen streams from two nozzles are placed on the heated iron, causing it to oxidize and melt. The oxygen streams are ejected with a velocity sufficient to agitate the molten mass. The iron is completely molten in ten to fifteen minutes. After the oxidation has continued for three to five minutes beyond this point, the promoter is added in small amounts in granular form so that it is thoroughly fused and mixed with the molten material. Thorough agitation is accomplished by means of the oxygen jets. The addition of the promoters requires about two minutes. The oxidation is continued until it is complete, as evidenced by the formation of a crust on the surface, followed by the cooling and hardening of the entire mass. The total oxidation requires about 25 minutes.

After the oxidation is complete, the mass is allowed to cool to room temperature and is then broken out of the crucible and ground to the desired size, usually 65 to 140 mesh. It is then ready for the reduction step which will be described subsequently.

The $Fe_3O_4$ may be prepared in other ways, as by oxy-hydrogen fusion of $Fe_2O_3$ according to the following reaction:

$$3Fe_2O_3 \rightarrow 2Fe_3O_4 + \tfrac{1}{2}O_2$$

The promoters are added to the iron oxide before fusing and the product is ground to the desired mesh size. Fe₃O₄ from other sources may also be used as a starting material in the fusion.

The reduction step is carried out by introducing the finely divided oxide into a vertical cylindrical reactor. The material is maintained in a fluidized condition by introducing hydrogen into the reducing zone at a velocity of about 0.3 foot per second (standard conditions) and the reduction temperature is maintained at a point between 450–550° C. for a minimum period of about 42 hours and until reduction is complete. The optimum temperature for the reduction of the catalyst is about 500° C. When reduced at lower temperatures the catalyst appears to be "wild" during the initial stages of the synthesis reaction and temperatures are almost impossible to control. When reduced at higher temperatures, among other effects, the activity of the catalyst falls off. In general good results are obtained in the temperature range specified. During the reduction, space velocities of about 1500–2500 are preferably utilized.

The promoters may be added in the form of the oxides themselves, or in the form of compounds thermally decomposable to form the oxides such as the nitrates, carbonates, hydroxides, etc. For example, potassium oxide may be incorporated as the nitrate or hydroxide, while the alumina may be incorporated as the oxide, aluminate, aluminum nitrate, etc. Calcium oxide may be incorporated as the carbonate or the oxide itself.

The synthesis reaction is preferably carried out in a vertical cylindrical reactor. The catalyst, in finely divided form, preferably 65–140 mesh, is introduced into the reactor and a mixture of H₂ and CO in the proportions of about 2 to 1, respectively, is flowed through the reactor at a linear velocity sufficient to efficiently fluidize the catalyst. A minimum linear velocity of about 0.6 foot per second is required. The catalyst is retained within the reactor and is not carried over into the product outlet, most of the catalyst settling by gravity and then being re-fluidized. Small proportions of catalyst which might carry over are prevented from doing so by providing a screen or other separating means ahead of the outlet. The result is what is known as a fluidized fixed bed with a portion of the catalyst preferably remaining in a more or less settled condition at the bottom of the chamber with the major portion existing in the chamber in a fluidized condition. The reaction is preferably carried out at a temperature of about 270–320° C. and with a space velocity of about 1500–3500 (vol./vol. cat./hr.). The pressure is preferably about 150–250 pounds per sq. in. gauge. The products of reaction are recovered for separation of C₃+ hydrocarbons and other desired materials, from which a gasoline boiling range material is separated as the chief product. A gaseous fraction, containing mostly unreacted CO and H₂, is recycled to the reactor in a ratio of 3:1 to about 7.5:1 based on the fresh synthesis gas feed. Recycling of tail gas has a two-fold function. First, it reduces the carbon monoxide concentration at the inlet so that an inordinate amount of reaction will not take place in the inlet zone of the reactor thus causing erratic temperatures. Second, it aids in maintaining the catalyst in a fluidized state.

The catalyst activity decreases slightly over successive periods of 24 to 48 hours. In order to maintain a high level of activity it has been found that short periodic flushings with hydrogen at reaction temperature and pressure are sufficient to restore the catalytic activity.

I claim:

1. A catalyst for the synthesis of hydrocarbons by the reduction of carbon monoxide with hydrogen which comprises promoted metallic iron formed by the reduction of a comminuted fused mixture of Fe₃O₄, 0.05–1.0 weight per cent of K₂O based on the Fe₃O₄, Al₂O₃ in a molecular equivalent proportion to the K₂O plus an excess of 1–2 weight per cent based on the Fe₃O₄, and CaO in the proportion of 1–10 per cent by weight of the Fe₃O₄.

2. A catalyst according to claim 1 containing about 0.5 per cent K₂O and about 5.0 per cent CaO.

3. A process for the synthesis of hydrocarbons which comprises contacting a synthesis gas mixture comprising carbon monoxide and hydrogen with a promoted metallic iron catalyst formed by the reduction of a comminuted fused mixture of Fe₃O₄, 0.05 to 1.0 weight per cent K₂O based on the Fe₃O₄, Al₂O₃ in an excess of 1 to 2 weight per cent based on the Fe₃O₄ over and above a molecular equivalent to the K₂O, and 1 to 10 weight per cent of CaO based on the Fe₃O₄.

4. The process of claim 3 in which the CaO in the catalyst is in the range of 3 to 7 weight per cent of the Fe₃O₄.

5. In a process for the hydrogenation of carbon monoxide employing a metallic iron catalyst, the method of improving the conversion of carbon monoxide to compounds containing at least three carbon atoms per molecule and inhibiting the formation of free carbon and high molecular weight waxes, which comprises utilizing as the catalyst a promoted metallic iron catalyst formed by reduction of a comminuted fused mixture of Fe₃O₄, 0.05 to 1.0 weight per cent K₂O based on the Fe₃O₄, 1 to 2 weight per cent of Al₂O₃ in excess of its molecular equivalent of the K₂O, and 1 to 10 weight per cent of CaO based on the Fe₃O₄.

ALFRED CLARK.

REFERENCES CITED

The following references are of record in the file of this patent:

UNITED STATES PATENTS

| Number | Name | Date |
| --- | --- | --- |
| 1,489,497 | Larson | Apr. 8, 1924 |
| 1,618,004 | Greathouse | Feb. 15, 1927 |
| 1,909,442 | Williams | May 16, 1933 |
| 2,292,570 | Klemm et al. | Aug. 11, 1942 |
| 2,436,957 | Eastman | Mar. 2, 1948 |
| 2,449,775 | Hendriksen | Sept. 21, 1948 |
| 2,472,219 | Lyons | June 7, 1949 |
| 2,501,695 | Sensel et al. | Mar. 28, 1950 |